Patented Nov. 6, 1934

1,980,013

UNITED STATES PATENT OFFICE 1,980,013

PROCESS OF PRESERVING FRUIT PEEL

Alexander W. Stott, Clearwater, Fla., assignor to The Hills Brothers Company, Inc., New York, N. Y., a corporation of New York No Drawing. Application August 5, 1932, Serial No. 627,604

5 Claims. (Cl. 99—11)

This invention relates to the treatment of fruit products for the purpose of preserving them and rendering them tender and palatable. More particularly, the invention is concerned with a novel process for preserving the rind and peel of fruits, the new process being especially suitable for the treatment of citron and the peel of lemons, oranges, and grapefruit. Accordingly, for the purpose of explaining the principles of the invention, the processing of citron in the new manner will be described in detail, though it is to be understood that the utility of the invention is not limited to that particular fruit.

The commercial product citron is the thick rind of that fruit, and, in preparing it for the market, the whole fruit taken from the trees is cut in half and immersed in brine to pickle it. The fruit may remain in the brine for a considerable period, and when the point where the preserving process is to be carried on is some distance from the groves, it is the common practice to ship the fruit to the factory in the brine.

Upon arrival at the factory, the fruit is removed from the brine and soaked in hot water for about an hour, the water being heated during this time as, for example, by the introduction of live steam. This treatment removes a substantial part of the salt from the fruit and, as soon as the fruit has been treated to the desired extent, the pulp is removed, and the rind is then soaked in cold water for a sufficient length of time to freshen the fruit by substantially complete removal of the salt.

In the preservation of citron according to the methods heretofore used, the rind upon completion of the cold water soaking is immersed in hot syrups, a series of syrups of successively increasing strength being used. In this treatment, the water which has soaked into the body of the rind is replaced by the sugar solids from the syrups, and the treatment is carried on in kettles with the syrups heated to a temperature below boiling for a period as long as two weeks. After the syrup treatment, the further processing of the citron depends on the final condition which the citron is to have. For citron of the type commonly known as "drained" and which contains no sugar on the surface, the fruit is dried, for example, in the open air, for a suitable period. In making the candied or glacé product, the citron is immersed in a heavy sugar syrup and then dried, the candied product being dried with the concave surface up, and the glacé citron being dried with the convex surface up. Upon completion of the drying, the material is ready for packing in containers or cartons, the citron in some instances being sliced and rolled in sugar before being packed.

The preparation of citron for the market in accordance with the old practice above described has a number of objectionable features, among the principal objections being the amount of time consumed in the process and the failure of the treatment to kill yeasts and other micro-organisms which are always present on the surface of the fruit. These micro-organisms are difficult to destroy and can only be rendered innocuous by treatment at a relatively high temperature. Such temperatures, however, cannot be employed in the processes heretofore used because they are likely to result in the citron being injured. Another objection to the old process is that in making sliced citron, the slicing operation is carried on after the fruit has been treated with syrups and is impregnated and coated therewith. Such material cannot be cut sharply and cleanly but is likely to be torn in the cutting. Also, the final product is likely to be stiff and tough.

The new process overcomes the objections above pointed out and results in the production of a product which is more tender and has a better appearance and flavor than that prepared by former methods, and in the new product the micro-organisms are destroyed.

In treating the citron in accordance with the new process, the preliminary hot soaking, removal of the pulp, and cold soaking are carried on as before. Thereafter, the fruit is sliced to form pieces of any desired size which may be about ⅛" thick. The sliced material is then placed in an open kettle containing a syrup made of cane sugar and corn syrup. The syrup used is a fairly light one containing about 45% of sugar solids, and a suitable syrup for the purpose will contain cane sugar and corn syrup in the ratio of 19 to 17. The kettle is heated to a temperature slightly above 212° F. as, for example, up to 220° F. and, during the heating, the material is constantly agitated so that it will not be burned and discolored. This cooking in the open kettle is continued until the citron is sufficiently tender and the syrup has reached a strength of about 65% of sugar solids, ordinarily about one-half to three-fourths of an hour of cooking at the temperature mentioned being sufficient for the purpose.

Upon completion of the cooking of the citron in the kettles, the material is placed in cans with a quantity of syrup. The syrup used is made up of sugar and corn syrup with approximately 65% of sugar solids and the quantity of syrup introduced into each can is preferably only sufficient to fill a part of the can and moisten the mass of sliced citron therein. The cans are then capped and placed in a heated retort where they are heated for a period of about one-half hour at a temperature from 212° F. to about 236° F. During this heating, the cans are not sealed, the caps being held lightly in place as by crimping.

After the heating, the cans are removed from the retort, the covers fully sealed, and the cans are replaced in the retort and heated for a further period of about one-half hour at the temperatures mentioned. This heating softens the citron and destroys the micro-organisms, and the citron takes up additional quantities of the sugar solids. While the heating for the periods and at the temperatures mentioned has proven satisfactory for the purpose, the heating may be carried on for longer periods at lower temperatures or for shorter periods at higher temperatures with substantially the same results. The temperature used, however, should not substantially exceed 240°, as at this temperature the citron is likely to become discolored and the sugar caramelized, but temperatures in excess of 212° F. are necessary in order to insure substantially complete destruction of the micro-organisms.

After the heat treatment in the retort, the cans are removed and placed in cold water until they are thoroughly cooled and they are then ready for labeling and shipment. Ordinarily, however, the cans will be in storage some time before shipment and it is desirable to reverse them from time to time so that the syrup contained therein will contact with all parts of the sliced citron. One such turning of the cans should be done at once after they are cooled.

By the new method, it will be observed that the citron is first heated in syrup in open kettles for a relatively short period of time and as the citron is covered by the syrup in the usual way, it is kept from contact with the air. Thereafter the citron with a small quantity of syrup is again heated in the can and during this heating, the citron is substantially out of contact with the air and a part of the air in each can is expelled. The final heating of the material in the cans takes place with the cans sealed. When the treatment is carried on in the manner described, discoloration of the citron is avoided but any substantial departure from the process causes the citron to be darkened and become brown. Fruit peels and rinds, such as citron, are extremely difficult to preserve because of the ease with which they discolor during the necessary heating operations. By my method, however, the heating for the purposes mentioned can be carried on without doing damage to the color or flavor of the product. As I use a 65% sugar syrup in the cans and the syrup employed in the kettles reaches this concentration at the end of the cooking in the kettles, I may use the kettle syrups in the cans, and this not only makes the process economical, but is considered to improve the flavor of the material in that some volatile substances in the citron may be evolved in the kettle cooking and are taken up by the syrup in the kettle. These substances are then conserved when the kettle syrup is used in the can.

The citron produced by the new process is in the form of clean-cut slices which are soft and tender and impregnated with the sugar to a substantially greater degree than the citron produced by the old process. Also, the micro-organisms are destroyed. In the old process, the temperatures which can be employed without discoloration or darkening of the citron are not sufficiently high to insure complete destruction of the micro-organisms and, as a consequence, it frequently happens that such citron, if stored for a substantial period before being used, develops white spots, becomes moldy, and otherwise deteriorates. Also the citron is likely to pick up germs and other micro-organisms during handling.

The treatment of orange, lemon, and grapefruit peel by the new process is substantially the same as that described in connection with citron with the exception that since the peel is thinner than citron, less time may be required for the heat treatments.

I claim:

1. A process for treating the rind of citrus fruits which comprises heating the rind in a syrup for a period sufficient to render the products tender, agitating the products during the heating, and thereafter placing the rind in containers with a quantity of syrup sufficient only to moisten the rind, heating the containers while partially sealed for about one-half hour to an hour at about 212° F. and thereafter completely sealing the containers and heating them for about one-half hour at about 236° F.

2. A process for treating the rind or peel of the fruit of the *citrus medica genuina*, which comprises slicing the rind or peel, heating it in a syrup in an open kettle with agitation for about one-half to three-quarters of an hour at about 212° to 220° F., placing the rind or peel in containers with a quantity of syrup sufficient only to moisten said material, partially sealing the containers, heating the containers for about one hour at 212° F., completely sealing the containers, and heating them for about one-half hour additional at about 236° F.

3. A process for treating the rind and peel of citrus fruits which comprises heating the material in a sugar syrup for a period not to exceed about one hour at a temperature from about 212° F. to about 220° F., placing the material in containers with a relatively small quantity of sugar syrup, heating the containers, while they are unsealed, for a period of about half an hour at a temperature from about 212° F. to about 240° F., sealing the containers, and heating them for a period of about half an hour at a temperature of about 212° F. to about 240° F.

4. A process for treating the rind and peel of citrus fruits which comprises heating the material in a sugar syrup for a period not to exceed about one hour at a temperature from about 212° F. to about 220° F., placing the material in containers with a relatively small quantity of sugar syrup, heating the containers, while they are unsealed, for a period of about half an hour at a temperature from about 212° F. to about 240° F., sealing the containers, heating the containers for a period of about half an hour at a temperature of about 212° F. to about 240° F., and inverting the containers after the completion of the last heating.

5. A process for treating the rind and peel of citrus fruits which comprises heating the material in sugar syrup in a kettle for a period of not to exceed a temperature of about 212° F. to about 220° F., agitating the material during said heating, placing the material in containers with sugar syrup of a sugar content of about 65%, closing the containers without sealing them, heating the containers for a period of about half an hour at a temperature from about 212° F. to about 240° F., sealing the containers, and heating them for a period of about half an hour at a temperature of about 212° F. to about 240° F.

ALEXANDER W. STOTT.

CERTIFICATE OF CORRECTION.

Patent No. 1,980,013.    November 6, 1934.

ALEXANDER W. STOTT.

It is hereby certified that error appears in the printed specification of the above numbered patent requiring correction as follows: Page 2, lines 89 and 90, claim 1, for the word "products" read rind; and that the said Letters Patent should be read with this correction therein that the same may conform to the record of the case in the Patent Office.

Signed and sealed this 8th day of January, A. D. 1935.

Leslie Frazer (Seal)    Acting Commissioner of Patents.